United States Patent
Zou et al.

(10) Patent No.: US 11,525,815 B2
(45) Date of Patent: Dec. 13, 2022

(54) METHOD FOR PRODUCT QUALITY CONTROL AND FINGERPRINT DETECTION OF EPIMEDIUM BREVICORNU COMPLEX

(71) Applicant: Chenland Nutritionals, Inc., Pomona, CA (US)

(72) Inventors: Shengcan Zou, Qingdao (CN); Li Li, Qingdao (CN); Lei Zong, Qingdao (CN); Jiancheng Zong, Qingdao (CN); Shanglong Wang, Qingdao (CN); Zengliang Zhang, Qingdao (CN)

( * ) Notice: Subject to any disclaimer, the term of this patent is extended or adjusted under 35 U.S.C. 154(b) by 416 days.

(21) Appl. No.: 16/846,454

(22) Filed: Apr. 13, 2020

(65) Prior Publication Data

US 2020/0240967 A1 Jul. 30, 2020

Related U.S. Application Data

(63) Continuation of application No. PCT/CN2019/111795, filed on Oct. 18, 2019.

(30) Foreign Application Priority Data

Sep. 30, 2019 (CN) .......................... 201910943748.8

(51) Int. Cl.
*G01N 30/86* (2006.01)
*G01N 1/28* (2006.01)
*G01N 30/08* (2006.01)
*G01N 30/02* (2006.01)

(52) U.S. Cl.
CPC .......... *G01N 30/8686* (2013.01); *G01N 1/28* (2013.01); *G01N 30/08* (2013.01); *G01N 2001/2893* (2013.01); *G01N 2030/027* (2013.01)

(58) Field of Classification Search
CPC ...... G01N 30/8686; G01N 1/28; G01N 30/08; G01N 2001/2893; G01N 2030/027; G01N 30/34; G01N 30/04; G01N 2030/047
See application file for complete search history.

(56) References Cited

PUBLICATIONS

Liu, Renmin, et al. "Preparative isolation and purification of three flavonoids from the Chinese medicinal plant Epimedium koreamum Nakai by high-speed counter-current chromatography." Journal of Chromatography A 1064.1 (2005): 53-57. (Year: 2005).*

* cited by examiner

*Primary Examiner* — Jennifer Wecker
*Assistant Examiner* — Michael Paul Shimek
(74) *Attorney, Agent, or Firm* — Rumit R. Kanakia

(57) ABSTRACT

The present invention discloses a method for product quality control and fingerprint detection of an epimedium brevicornu complex. The method uses high performance liquid chromatography, and can effectively realize the quality control of products containing traditional Chinese medicine components, and especially stable control of the quality of products containing a large quantity of non-traditional Chinese medicine components in formulas. Through step-by-step quality control, product quality fluctuation is reduced and stable quality is ensured. Meanwhile, the method is simple and convenient, does not need additional instruments and standards, saves the cost and is more conducive to actual production.

5 Claims, 2 Drawing Sheets

METHOD FOR PRODUCT QUALITY CONTROL AND FINGERPRINT DETECTION OF EPIMEDIUM BREVICORNU COMPLEX

TECHNICAL FIELD

The present invention relates to the field of analysis of traditional Chinese medicine, and more particularly relates to a method for product quality control and fingerprint detection of an epimedium brevicornu complex.

BACKGROUND

The present invention relates to a method for product quality control and a fingerprint, and particularly relates to a method for product quality control through a method of content determination and fingerprint. The content determination of index components means that content detection is conducted through corresponding standards and test articles by high performance liquid chromatography and the content of the substance in the test article is calculated through the content of the standards. The content determination of index components is currently a common method for quality control of traditional Chinese medicine related products.

The traditional Chinese medicine fingerprint refers to an atlas obtained by means of modern information collection technology and quality analysis means after appropriate treatment of some traditional Chinese medicines or Chinese patent medicines and capable of displaying images, figures, spectrograms and data of chemical features of the traditional Chinese medicines or the Chinese patent medicines. As a quality control mode, the traditional Chinese medicine fingerprint is gradually valued by people. The most basic attributes in the chromatographic fingerprints are integrity and ambiguity. It is a comprehensive and quantizable identification means, is based on system research of chemical components of the traditional Chinese medicine and is mainly used for evaluating the authenticity, the superiority and the stability of the quality of semi-finished products of the traditional Chinese medicines and the traditional Chinese medicine formulations.

The existing quality standards of traditional Chinese medicine decoction pieces and compound decoctions and granules generally include two aspects: morphological identification, physical and chemical identification, and spectral chromatographic analysis, wherein the spectral chromatographic analysis generally includes thin layer chromatography, high performance liquid content determination method and fingerprinting method. If the product contains many components, the chemical components contained therein are relatively complicated and interference factors are numerous in many aspects. Therefore, the research is difficult, and it is difficult to achieve accurate, stable and controllable production. At present, the field of pharmaceutical compound formulations has only one or two index components in terms of content control, and is single in quality control, fewer in indexes and difficult to comprehensively reflect the quality status of the product. In the extraction process of the traditional Chinese medicine, due to the limitations of the technology and the quality of the traditional Chinese medicine, each batch of the obtained extracts has obvious differences. If quality control is conducted only through common content determination, even if the content needs are satisfied, the overall quality of the product is fluctuated. If control indexes are increased, the material basis needs to be clarified through mass spectrometry, and then content detection is conducted through the standards. Because the components contained in the traditional Chinese medicine have diversity, if quality control is conducted by the method of adding the indexes for content determination, the time and money cost of quality control may be increased and the difficulty of quality control may be increased, which is not conducive to practical application.

Therefore, with respect to the above problems, the problem to be urgently solved by those skilled in the art is to provide a method for product quality control and fingerprint detection of an epimedium brevicornu complex.

SUMMARY

In view of this, the present invention provides a method for product quality control and fingerprint detection of an epimedium brevicornu complex. The method uses high performance liquid chromatography, and can effectively realize the quality control of products containing traditional Chinese medicine components, and especially stable control of the quality of products containing a large quantity of non-traditional Chinese medicine components in formulas.

To achieve the above purpose, the present invention adopts the following technical solution:

A method for product quality control and fingerprint detection of an epimedium brevicornu complex is provided. The method for product quality control and fingerprint detection of raw materials of the complex comprises:

S1, icariin:

a. preparation of a standard solution: taking 10 mg of icariin standard into 10 ml volumetric flask, dissolving in methanol, and making constant volume;

b. preparation of an extract sample solution: taking 0.1 g of epimedium brevicornu extract; putting the extract into a conical flask with a stopper, adding 50 ml of methanol; weighing the materials; conducting ultrasonic treatment for 30 min; weighing the materials again; making up the lost weight with the methanol; shaking up; filtering, standing; and taking the supernatant;

c. content determination:

chromatographic conditions:

mobile phase A is acetonitrile, mobile phase B is water, acetonitrile:water=30:70, and isocratic elution;

detection wavelength is 270 nm; column temperature is 30° C.; flow rate is 1 ml/min; sample injection volume is 10 μl; and sample injection is performed twice;

isocratic elution conditions:

| time, min | mobile phase A %, acetonitrile | mobile phase B %, water |
|---|---|---|
| 0-15 | 30 | 70; | d. making of a standard curve: diluting the standard solution by ½ gradient to obtain 5 concentration gradients, analyzing according to the chromatographic conditions, and drawing the standard curve;

taking the extract sample solution, analyzing according to the chromatographic conditions, and calculating the content of the icariin through the standard curve;

fingerprint conditions of the epimedium brevicornu extract:

(1) accurately weighing 0.1 g of epimedium brevicornu extract into 50 ml volumetric flask; dissolving in methanol; conducting ultrasonic treatment for 30 min; placing at room temperature; making constant volume; filtering, concentrating; and passing through a membrane;

(2) chromatographic conditions: octadecylsilane chemically bonded silica is used as a filler; the flow rate is 1 ml/min; the wavelength is 269 nm; the column temperature is 30° C.; the sample injection volume is 10 µl; and the sample injection is performed once;

| | time, min | | | | |
|---|---|---|---|---|---|
| | 0-17 | 17-35 | 35-65 | 65-70 | 70-85 |
| acetonitrile, % | 15-23 | 23 | 23-50 | 50-15 | 15; |

S2, tanshinone IIA:
a. preparation of the standard solution: taking 6 mg of tanshinone IIA standard into 10 ml volumetric flask, dissolving in methanol, and making constant volume;
b. preparation of the extract sample solution: taking 0.1 g of salviae miltiorrhizae extract; putting the extract into a conical flask with a stopper, adding 50 ml of methanol; weighing the materials; conducting ultrasonic treatment for 30 min; weighing the materials again; making up the lost weight with the methanol; shaking up; filtering, standing; and taking the supernatant;
c. content determination:
chromatographic conditions:
mobile phase A is acetonitrile, mobile phase B is water, and gradient elution;
detection wavelength is 270 nm; column temperature is 20° C.; flow rate is 1 ml/min; sample injection volume is 10 µl; and sample injection is performed twice;
gradient elution conditions:

| time, min | mobile phase A %, acetonitrile | mobile phase B %, water |
|---|---|---|
| 0-6 | 61 | 39 |
| 6-20 | 61-90 | 39-10 |
| 20-20.5 | 90-61 | 10-39 |
| 20.5-30 | 61 | 39; | d. making of a standard curve: diluting the standard solution by ½ gradient to obtain 5 concentration gradients, analyzing according to the chromatographic conditions, and drawing the standard curve;
taking the extract sample solution, analyzing according to the chromatographic conditions, and calculating the content of the tanshinone IIA through the standard curve;
fingerprint conditions of the salviae miltiorrhizae extract:
(1) accurately weighing 0.1 g of salviae miltiorrhizae extract into 50 ml volumetric flask; dissolving in methanol; conducting ultrasonic treatment for 30 min; placing at room temperature; making constant volume; filtering; concentrating; and passing through a membrane;
(2) chromatographic conditions: octadecylsilane chemically bonded silica is used as a filler; the flow rate is 1 ml/min; the wavelength is 270 nm; the column temperature is room temperature; the sample injection volume is 10 µl; and the sample injection is performed once;

| | time, min | | | |
|---|---|---|---|---|
| | 0-20 | 20-50 | 50-52 | 52-62 |
| acetonitrile, % | 20-60 | 60-80 | 80-20 | 20; |

S3, protodioscin:
a. preparation of the standard solution: taking 8 mg of protodioscin standard into 10 ml volumetric flask, dissolving in methanol, and making constant volume;
b. preparation of the extract sample solution: taking 0.1 g of *Dioscorea nipponica* makino extract; putting the extract into a conical flask with a stopper, adding 50 ml of methanol; weighing the materials; conducting ultrasonic treatment for 30 min; weighing the materials again; making up the lost weight with the methanol; shaking up; filtering, standing; and taking the supernatant;
c. content determination:
chromatographic conditions:
octadecylsilane chemically bonded silica is used as a filler;
mobile phase A is acetonitrile, mobile phase B is water, acetonitrile:water=37:63, and isocratic elution;
detection wavelength is 203 nm; column temperature is 30° C.: flow rate is 1 ml/min; sample injection volume is 10 µl; and sample injection is performed twice;
isocratic elution conditions:

| time, min | mobile phase A %, acetonitrile | mobile phase B %, water |
|---|---|---|
| 0-10 | 37 | 63 | taking the standard solution and the extract sample solution, analyzing according to the chromatographic conditions, and calculating the content of the protodioscin through a single-point method;
fingerprint conditions of *Dioscorea nipponica* makino extract:
(1) accurately weighing 0.1 g of *Dioscorea nipponica* makino extract into 50 ml volumetric flask, dissolving in methanol; conducting ultrasonic treatment for 30 min; placing at room temperature; making constant volume; filtering, concentrating; and passing through a membrane;
(2) chromatographic conditions: octadecylsilane chemically bonded silica is used as a filler, flow rate is 1 ml/min; wavelength is 210 nm; column temperature is 30° C.; sample injection volume is 10 µl; and sample injection is performed once;

| | time, min | | | | | | |
|---|---|---|---|---|---|---|---|
| | 0-10 | 10-20 | 20-40 | 40-55 | 55-65 | 65-70 | 70-80 |
| acetonitrile, % | 20-25 | 25-35 | 35-80 | 80-100 | 100 | 100-20 | 20. |

Preferably, the epimedium brevicornu complex is composed of the following raw materials in parts by weight: 1.2 parts of glucosamine, 0.4 part of collagen, 0.2 part of chondroitin sulfate and 0.35 part of traditional Chinese medicine extract.
Preferably, the traditional Chinese medicine extract comprises the following components in parts by weight: 7-12 parts of epimedium brevicornu, 0.5-3 parts of salviae miltiorrhizae, 6.5-9 parts of *Dioscorea nipponica* makino, 1-5 parts of rhizoma drynariae and 1-5 parts of dodder.
It should be noted that the rhizoma drynariae and the dodder in the raw materials of the present invention are detected by an ultraviolet spectrophotometer, a light absorption value is detected by a spectrophotometer for the glucosamine and the chondroitin sulfate; and the collagen is detected by kjeldahl determination and amino acid analyzer.

Preferably, the specific preparation steps of the epimedium brevicornu complex are as follows:

S1, weighing the epimedium brevicornu, the salviae miltiorrhizae, the *Dioscorea nipponica* makino, the rhizoma drynariae and the dodder in proportion; extracting with an alcohol extraction technology; purifying with macroporous resin; concentrating and spray-drying to obtain the traditional Chinese medicine extracts;

S2, mixing the traditional Chinese medicine extracts obtained in the step S1 with the glucosamine, the collagen and the chondroitin sulfate, and uniformly stirring to obtain the epimedium brevicornu complex.

A method for product quality control and fingerprint detection of an epimedium brevicornu complex is provided. The method for product quality control and fingerprint detection of the epimedium brevicornu complex comprises:

S1, fingerprint detection of chromatographic condition 1:

a chromatographic column adopts octadecylsilane chemically bonded silica as a filler;

mobile phase A is acetonitrile, mobile phase B is water, and gradient elution;

detection wavelength is 210-270 nm; column temperature is 30° C.; flow rate is 1 ml/min; and sample injection volume is 10 μl;

gradient elution conditions:

| time, min | mobile phase A %, acetonitrile | mobile phase B %, water |
|---|---|---|
| 0-5 | 5-20 | 95-80 |
| 5-15 | 20-30 | 80-70 |
| 15-35 | 30-50 | 70-50 |
| 35-40 | 50-60 | 50-40 |
| 40-50 | 60-80 | 40-20 |
| 50-60 | 80-100 | 20-0; | product content detection of chromatographic condition 2:

mobile phase A is acetonitrile, mobile phase B is water, acetonitrile:water=30:70, and gradient elution;

detection wavelength is 270 nm; column temperature is 30° C.; flow rate is 1 ml/min; sample injection volume is 10 μl; and sample injection is performed twice;

S2, preparation of a test article accurately weighing 1 g of epimedium brevicornu complex; putting the composition into a conical flask with a stopper, adding 500 ml of methanol; weighing the materials; conducting ultrasonic treatment for 30 min; weighing the materials again; making up the lost weight with the methanol; shaking up; filtering; concentrating the filtrate to 50 ml; standing, and taking the supernatant;

S3: preparation of the standard solution taking 10 mg of icariin standard into 10 ml volumetric flask, dissolving in methanol, and making constant volume;

making of a standard curve: diluting the standard solution by ½ gradient to obtain 5 concentration gradients: 0.0625 mg/ml, 0.125 mg/ml, 0.25 mg/ml, 0.5 mg/ml and 1.0 mg/ml; analyzing according to the chromatographic condition 2; and drawing the standard curve;

taking the supernatant obtained in step S2, analyzing according to the chromatographic condition 2, and calculating the content through the standard curve;

taking the supernatant obtained in step S2, and analyzing according to the chromatographic condition 1 to obtain a fingerprint.

Preferably, the fingerprint of the epimedium brevicornu complex is:

the fingerprint comprises 15 common peaks, and the relative retention times of the peaks are:

(1) 3.263, (2) 16.857, (3) 17.785, (4) 20.299, (5) 23.178, (6) 23.747, (7) 24.167, (8S) 25.357, (9) 27.064, (10) 28.092, (11) 37.908, (12) 41.202, (13) 53.441, (14) 54.928 and (15) 58.238.

Preferably, the methanol is a 100% methanol solution.

Preferably, the graph of the standard curve uses the concentration as the abscissa and the peak area as the ordinate.

It can be known from the above technical solution that compared with the prior art, the present invention has the following beneficial effects:

The present invention establishes a method for product quality control and fingerprint detection of an epimedium brevicornu complex using high performance liquid chromatography. The technical solution of the present invention shortens the detection time and reduces the cost, and can ensure the stability and the accuracy of the detection data under the condition that the proportion of the total weight of the detected traditional Chinese medicine components is low. The fingerprint is combined with quantitative content detection, so that product quality is more reliable.

The present invention performs quality control on each traditional Chinese medicine extract involved in the formula, selects a main index component for content determination, and selects 3-4 main peaks in the fingerprint to quantify the fingerprint, so as to ensure that the used extracts satisfy the standards.

Secondly, the present invention uniformly mixes the extracted traditional Chinese medicine components with other components, and uses the methanol to extract and enrich the product. The enriched sample is analyzed by high performance liquid chromatography. The content determination of 1-2 traditional Chinese medicine-related index components is conducted and 5-8 main peaks are selected for fingerprint quantification.

The present invention overcomes the defects in the prior art that the traditional Chinese medicine compound formulation has only one or two index components in terms of content control, and is single in quality control, fewer in indexes and difficult to comprehensively reflect the quality status of the traditional Chinese medicine composition with abundant material basis. Through step-by-step quality control, product quality fluctuation is reduced and stable quality is ensured. Meanwhile, the method is simple and convenient, does not need additional instruments and standards, saves the cost and is more conducive to actual production.

BRIEF DESCRIPTION OF THE DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION

Figure 1:
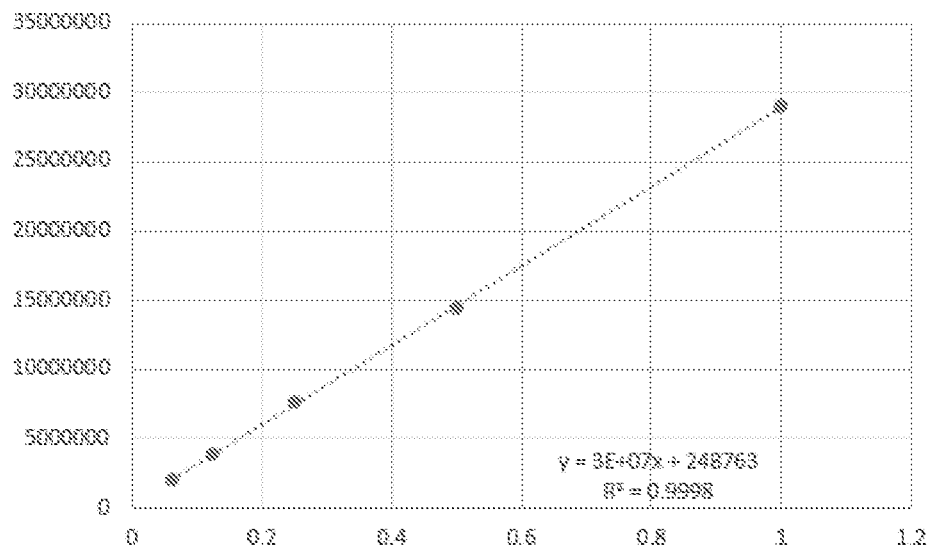
FIG. 1 is a standard curve chart of content determination of icariin for raw material detection in embodiment 1.
Figure 2:
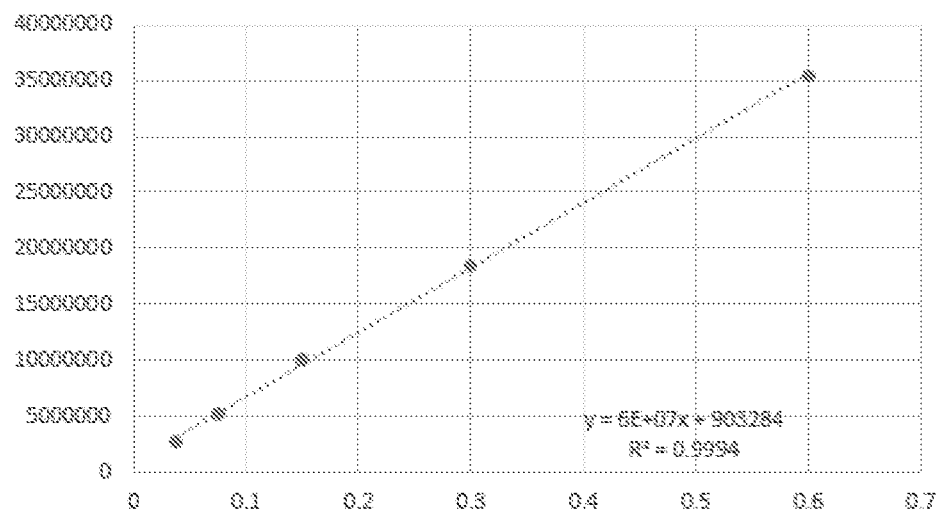
FIG. 2 is a standard curve chart of content determination of tanshinone IIA for raw material detection in embodiment 1.
Figure 3:
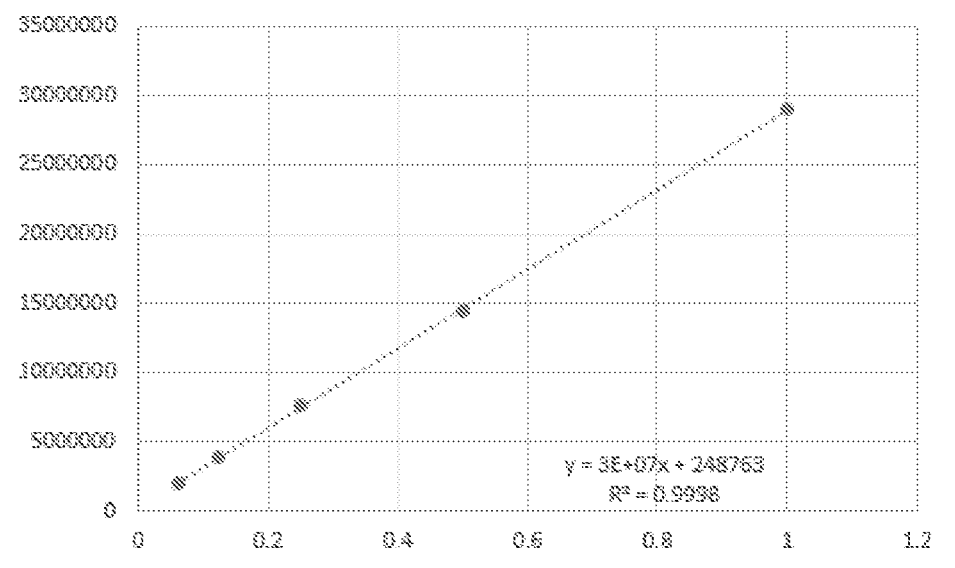
FIG. 3 is a standard curve chart of content determination of icariin for complex detection in embodiment 1.

The technical solution in embodiments of the present invention will be clearly and fully described below. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

Embodiment 1 of the present invention discloses a method for product quality control and fingerprint detection of an epimedium brevicornu complex. The adopted technical solution is as follows:

The epimedium brevicornu complex is composed of the following raw materials: 1200 g of glucosamine, 400 g of collagen, 200 g of chondroitin sulfate and 350 g of traditional Chinese medicine extract. The traditional Chinese medicine extract comprises the following components: 153 g of epimedium brevicornu, 11 g of salviae miltiorrhizae, 153 g of *Dioscorea nipponica* makino, 16 g of rhizoma drynariae and 17 g of dodder.

(1) Product quality control and fingerprint detection of the traditional Chinese medicine extract:

S1, icariin:

a. preparation of a standard solution: taking 10 mg of icariin standard into 10 ml volumetric flask, dissolving in methanol, and making constant volume;

b. preparation of an extract sample solution: taking 0.1 g of epimedium brevicornu extract; putting the extract into a conical flask with a stopper, adding 50 ml of methanol; weighing the materials; conducting ultrasonic treatment for 30 min; weighing the materials again; making up the lost weight with the methanol; shaking up; filtering, standing; and taking the supernatant;

c. content determination:

chromatographic conditions:

mobile phase A is acetonitrile, mobile phase B is water, acetonitrile:water=30:70, and isocratic elution;

detection wavelength is 270 nm; column temperature is 30° C.; flow rate is 1 ml/min; sample injection volume is 10 μl; and sample injection is performed twice;

isocratic elution conditions:

| time, min | mobile phase A %, acetonitrile | mobile phase B %, water |
|---|---|---|
| 0-15 | 30 | 70; | d. making of a standard curve: diluting the standard solution by ½ gradient to obtain 5 concentration gradients which are respectively 0.0625 mg/ml, 0.125 mg/ml, 0.25 mg/ml, 0.5 mg/ml and 1.0 mg/ml, analyzing according to the chromatographic conditions, and drawing the standard curve; taking the extract sample solution, analyzing according to the chromatographic conditions, and calculating the content of the icariin through the standard curve, wherein the content of the icariin is calculated as 20.5% according to the sample peak area and the drawn standard curve.

Fingerprint conditions of the epimedium brevicornu extract:

(1) sample preparation: accurately weighing 0.1 g of epimedium brevicornu extract into 50 ml volumetric flask; dissolving in methanol; conducting ultrasonic treatment for 30 min; placing at room temperature; making constant volume; filtering; concentrating; and passing through a membrane.

(2) Chromatographic conditions: octadecylsilane chemically bonded silica is used as a filler; the flow rate is 1 ml/min; the wavelength is 269 nm; the column temperature is 30° C.; the sample injection volume is 10/1; and the sample injection is performed once;

| | time/min | | | | |
|---|---|---|---|---|---|
| | 0-17 | 17-35 | 35-65 | 65-70 | 70-85 |
| acetonitrile (%) | 15-23 | 23 | 23-50 | 50-15 | 15 |

The similarity calculation software is a similarity evaluation system for chromatographic fingerprints of traditional Chinese medicine specified by the Chinese Pharmacopoeia Commission. After determination, the similarity with the standard fingerprint is 0.99996.

S2, Tanshinone IIA:

a. preparation of the standard solution: taking 6 mg of tanshinone IIA standard into 10 ml volumetric flask, dissolving in methanol, and making constant volume;

b. preparation of the extract sample solution: taking 0.1 g of salviae miltiorrhizae extract; putting the extract into a conical flask with a stopper, adding 50 ml of methanol; weighing the materials; conducting ultrasonic treatment for 30 min; weighing the materials again; making up the lost weight with the methanol; shaking up; filtering; standing; and taking the supernatant;

c. content determination:

chromatographic conditions:

mobile phase A is acetonitrile, mobile phase B is water, and gradient elution;

detection wavelength is 270 nm; column temperature is 20° C.; flow rate is 1 ml/min; sample injection volume is 10 μl; and sample injection is performed twice;

gradient elution conditions:

| time, min | mobile phase A %, acetonitrile | mobile phase B %, water |
|---|---|---|
| 0-6 | 61 | 39 |
| 6-20 | 61-90 | 39-10 |
| 20-20.5 | 90-61 | 10-39 |
| 20.5-30 | 61 | 39; | d. making of a standard curve: diluting the standard solution by ½ gradient to obtain 5 concentration gradients which are respectively 0.0375 mg/ml, 0.075 mg/ml, 0.15 mg/ml, 0.3 mg/ml and 0.6 mg/ml, analyzing according to the chromatographic conditions, and drawing the standard curve;

taking the extract sample solution, analyzing according to the chromatographic conditions, and calculating the content of the tanshinone IIA through the standard curve, wherein the content of the tanshinone IIA is calculated as 5.05% according to the sample peak area and the drawn standard curve.

Fingerprint conditions of the salviae miltiorrhizae extract:

(1) chromatographic conditions: accurately weighing 0.1 g of salviae miltiorrhizae extract into 50 ml volumetric flask; dissolving in methanol; conducting ultrasonic treatment for 30 min; placing at room temperature; making constant volume; filtering, concentrating, and passing through a membrane.

(2) Chromatographic conditions: octadecylsilane chemically bonded silica is used as a filler; the flow rate is 1 ml/min; the wavelength is 270 nm; the column temperature is room temperature; the sample injection volume is 10 µl; and the sample injection is performed once.

|  | time/min | | | |
| --- | --- | --- | --- | --- |
|  | 0-20 | 20-50 | 50-52 | 52-62 |
| acetonitrile (%) | 20-60 | 60-80 | 80-20 | 20 |

The similarity calculation software is a similarity evaluation system for chromatographic fingerprints of traditional Chinese medicine specified by the Chinese Pharmacopoeia Commission. After determination, the similarity with the standard fingerprint is 0.998.

S3, Protodioscin:

a. preparation of the standard solution: taking 8 mg of protodioscin standard into 10 ml volumetric flask, dissolving in methanol, and making constant volume;

b. preparation of the extract sample solution: taking 0.1 g of *Dioscorea nipponica* makino extract; putting the extract into a conical flask with a stopper, adding 50 ml of methanol; weighing the materials; conducting ultrasonic treatment for 30 min; weighing the materials again; making up the lost weight with the methanol; shaking up; filtering, standing; and taking the supernatant;

c. content determination:

chromatographic conditions:

octadecylsilane chemically bonded silica is used as a filler;

mobile phase A is acetonitrile, mobile phase B is water, acetonitrile:water=37:63, and isocratic elution;

detection wavelength is 203 nm; column temperature is 30° C.; flow rate is 1 ml/min; sample injection volume is 10 µl; and sample injection is performed twice;

isocratic elution conditions:

| time, min | mobile phase A %, acetonitrile | mobile phase B %, water |
| --- | --- | --- |
| 0-10 | 37 | 63 | taking the standard solution and the extract sample solution, analyzing according to the chromatographic conditions, and calculating the content of the protodioscin through a single-point method, wherein the content of the protodioscin is calculated as 40.22% according to the single-point method.

Fingerprint conditions of *Dioscorea nipponica* makino extract:

(1) chromatographic conditions: accurately weighing 0.1 g of *Dioscorea nipponica* makino extract into 50 ml volumetric flask; dissolving in methanol; conducting ultrasonic treatment for 30 min; placing at room temperature; making constant volume; filtering, concentrating, and passing through a membrane;

(2) chromatographic conditions: octadecylsilane chemically bonded silica is used as a filler, flow rate is 1 ml/min; wavelength is 210 nm; column temperature is 30° C.; sample injection volume is 10 µl; and sample injection is performed once;

|  | time/min | | | | | | |
| --- | --- | --- | --- | --- | --- | --- | --- |
|  | 0-10 | 10-20 | 20-40 | 40-55 | 55-65 | 65-70 | 70-80 |
| acetonitrile (%) | 20-25 | 25-35 | 35-80 | 80-100 | 100 | 100-20 | 20 |

The similarity calculation software is a similarity evaluation system for chromatographic fingerprints of traditional Chinese medicine specified by the Chinese Pharmacopoeia Commission. After determination, the similarity with the standard fingerprint is 0.9993.

(2) Product quality control and fingerprint detection of the epimedium brevicornu complex:

S1, fingerprint detection of chromatographic condition 1:

a chromatographic column adopts octadecylsilane chemically bonded silica as a filler;

mobile phase A is acetonitrile, mobile phase B is water, and gradient elution;

detection wavelength is 210-270 nm; column temperature is 30° C.; flow rate is 1 ml/min; and sample injection volume is 101 µl;

gradient elution conditions:

| time, min | mobile phase A %, acetonitrile | mobile phase B %, water |
| --- | --- | --- |
| 0-5 | 5-20 | 95-80 |
| 5-15 | 20-30 | 80-70 |
| 15-35 | 30-50 | 70-50 |
| 35-40 | 50-60 | 50-40 |
| 40-50 | 60-80 | 40-20 |
| 50-60 | 80-100 | 20-0; | product content detection of chromatographic condition 2:

mobile phase A is acetonitrile, mobile phase B is water, acetonitrile:water=30:70, and gradient elution;

detection wavelength is 270 nm; column temperature is 30° C.; flow rate is 1 ml/min; sample injection volume is 10 µl; and sample injection is performed twice;

S2, preparation of a test article accurately weighing 1 g of epimedium brevicornu complex; putting the composition into a conical flask with a stopper, adding 500 ml of methanol; weighing the materials; conducting ultrasonic treatment for 30 min; weighing the materials again; making up the lost weight with the methanol; shaking up; filtering; concentrating the filtrate to 50 ml; standing; and taking the supernatant;

S3: preparation of the standard solution taking 10 mg of icariin standard into 10 ml volumetric flask, dissolving in methanol, and making constant volume;

making of a standard curve: diluting the standard solution by ½ gradient to obtain 5 concentration gradients: 0.0625 mg/ml, 0.125 mg/ml, 0.25 mg/ml, 0.5 mg/ml and 1.0 mg/ml; analyzing according to the chromatographic condition 2; and drawing the standard curve;

taking the supernatant obtained in step S2, analyzing according to the chromatographic condition 2, and calculating the content through the standard curve;

taking the supernatant obtained in step S2, and analyzing according to the chromatographic condition 1 to obtain a fingerprint.

The content of the icariin is calculated as 1.61% according to the sample peak area and the drawn standard curve.

Fingerprint detection of the epimedium brevicornu complex:

the fingerprint comprises 15 common peaks, and the relative retention times of the peaks are:

(1) 3.263, (2) 16.857, (3) 17.785, (4) 20.299, (5) 23.178, (6) 23.747, (7) 24.167, (8S) 25.357, (9) 27.064, (10) 28.092, (11) 37.908, (12) 41.202, (13) 53.441, (14) 54.928 and (15) 58.238.

The similarity calculation software is a similarity evaluation system for chromatographic fingerprints of traditional Chinese medicine specified by the Chinese Pharmacopoeia Commission. After determination, the similarity with the standard fingerprint is 0.994.

Embodiment 2

Embodiment 2 of the present invention discloses a method for product quality control and fingerprint detection of an epimedium brevicornu complex. The adopted technical solution is as follows:

The epimedium brevicornu complex is composed of the following raw materials: 1200 g of glucosamine, 400 g of collagen, 200 g of chondroitin sulfate and 350 g of traditional Chinese medicine extract. The traditional Chinese medicine extract comprises the following components: 165 g of epimedium brevicornu, 10 g of salviae miltiorrhizae, 144 g of *Dioscorea nipponica* makino, 16 g of rhizoma drynariae and 15 g of dodder.

(1) Product quality control and fingerprint detection of the traditional Chinese medicine extract:

S1, icariin:

a. preparation of a standard solution;

b. preparation of an extract sample solution;

c. content determination;

making of a standard curve: diluting the standard solution by ½ gradient to obtain 5 concentration gradients which are respectively 0.075 mg/ml, 0.15 mg/ml, 0.3 mg/ml, 0.6 mg/ml and 1.2 mg/ml, analyzing according to the chromatographic conditions, and drawing the standard curve;

calculating the content of the icariin as 20.5% according to the sample peak area and the drawn standard curve.

Fingerprint of the epimedium brevicornu extract:

The similarity calculation software is a similarity evaluation system for chromatographic fingerprints of traditional Chinese medicine specified by the Chinese Pharmacopoeia Commission. After determination, the similarity with the standard fingerprint is 0.9998.

S2, Tanshinone IIA:

taking the extract sample solution, analyzing according to the chromatographic conditions, and calculating the content of the tanshinone IIA through the standard curve. The content of the tanshinone IIA is calculated as 5.06% according to the sample peak area and the drawn standard curve.

Fingerprint of the salviae miltiorrhizae extract:

The similarity calculation software is a similarity evaluation system for chromatographic fingerprints of traditional Chinese medicine specified by the Chinese Pharmacopoeia Commission. After determination, the similarity with the standard fingerprint is 0.9991.

S3, Protodioscin:

taking the standard solution and the extract sample solution, analyzing according to the chromatographic conditions, and calculating the content of the protodioscin through a single-point method. The content of the protodioscin is calculated as 40.24% according to the single-point method.

Fingerprint of the *Dioscorea nipponica* makino extract:

The similarity calculation software is a similarity evaluation system for chromatographic fingerprints of traditional Chinese medicine specified by the Chinese Pharmacopoeia Commission. After determination, the similarity with the standard fingerprint is 0.9995.

(2) Product quality control and fingerprint detection of the epimedium brevicornu complex:

The content of the icariin is calculated as 1.73% according to the sample peak area and the drawn standard curve.

Fingerprint detection of the epimedium brevicornu complex:

the fingerprint comprises 15 common peaks, and the relative retention times of the peaks are:

(1) 3.271, (2) 16.850, (3) 17.792, (4) 20.323, (5) 23.181, (6) 23.762, (7) 24.190, (8S) 25.362, (9) 27.077, (10) 28.012, (11) 37.934, (12) 41.216, (13) 53.443, (14) 54.939 and (15) 58.244.

The similarity calculation software is a similarity evaluation system for chromatographic fingerprints of traditional Chinese medicine specified by the Chinese Pharmacopoeia Commission. After determination, the similarity with the standard fingerprint is 0.99992.

Embodiment 3

Embodiment 3 of the present invention discloses a method for product quality control and fingerprint detection of an epimedium brevicornu complex. The adopted technical solution is as follows:

The epimedium brevicornu complex is composed of the following raw materials: 2400 g of glucosamine, 800 g of collagen, 400 g of chondroitin sulfate and 700 g of traditional Chinese medicine extract. The traditional Chinese medicine extract comprises the following components: 245 g of epimedium brevicornu, 35 g of salviae miltiorrhizae, 315 g of *Dioscorea nipponica* makino, 35 g of rhizoma drynariae and 70 g of dodder.

(1) Product quality control and fingerprint detection of the traditional Chinese medicine extract:

S1, icariin:

a. preparation of a standard solution;

b. preparation of an extract sample solution;

c. content determination;

making of a standard curve: diluting the standard solution by ½ gradient to obtain 5 concentration gradients which are respectively 0.075 mg/ml, 0.15 mg/ml, 0.3 mg/ml, 0.6 mg/ml and 1.2 mg/ml, analyzing according to the chromatographic conditions, and drawing the standard curve;

calculating the content of the icariin as 20.3% according to the sample peak area and the drawn standard curve.

Fingerprint of the epimedium brevicornu extract:

The similarity calculation software is a similarity evaluation system for chromatographic fingerprints of traditional Chinese medicine specified by the Chinese Pharmacopoeia Commission. After determination, the similarity with the standard fingerprint is 0.99999.

S2, Tanshinone IIA:

taking the extract sample solution, analyzing according to the chromatographic conditions, and calculating the content of the tanshinone IIA through the standard curve. The content of the tanshinone IIA is calculated as 5.07% according to the sample peak area and the drawn standard curve.

Fingerprint of the salviae miltiorrhizae extract:

The similarity calculation software is a similarity evaluation system for chromatographic fingerprints of traditional Chinese medicine specified by the Chinese Pharmacopoeia Commission. After determination, the similarity with the standard fingerprint is 0.992.

S3, Protodioscin:

taking the standard solution and the extract sample solution, analyzing according to the chromatographic conditions, and calculating the content of the protodioscin through a single-point method. The content of the protodioscin is calculated as 40.30% according to the single-point method.

Fingerprint of the *Dioscorea nipponica* makino extract:

The similarity calculation software is a similarity evaluation system for chromatographic fingerprints of traditional Chinese medicine specified by the Chinese Pharmacopoeia Commission. After determination, the similarity with the standard fingerprint is 0.9989.

(2) Product quality control and fingerprint detection of the epimedium brevicornu complex:

The content of the icariin is calculated as 1.29% according to the sample peak area and the drawn standard curve.

Fingerprint detection of the epimedium brevicornu complex:

the fingerprint comprises 15 common peaks, and the relative retention times of the peaks are:

(1) 3.263, (2) 16.846, (3) 17.782, (4) 20.301, (5) 23.174, (6) 23.752, (7) 24.183, (8S) 25.359, (9) 27.068, (10) 28.012, (11) 37.911, (12) 41.206, (13) 53.444, (14) 54.935 and (15) 58.241.

The similarity calculation software is a similarity evaluation system for chromatographic fingerprints of traditional Chinese medicine specified by the Chinese Pharmacopoeia Commission. After determination, the similarity with the standard fingerprint is 0.9991.

Each embodiment in the description is described in a progressive way. The difference of each embodiment from each other is the focus of explanation. The same and similar parts among all of the embodiments can be referred to each other.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

The invention claimed is:

1. A method for product quality control and fingerprint detection of an epimedium brevicornu complex, the method for product quality control and fingerprint detection of raw materials of the complex comprising:

Step 1:
a. preparation of a standard solution by placing 10 mg of an icariin standard into a 10 ml volumetric flask, dissolving in methanol, and making constant volume;
b. preparation of an extract sample solution by placing 0.1 g of epimedium brevicornu extract into a conical flask with a stopper; adding 50 ml of methanol; weighing the materials; conducting ultrasonic treatment for 30 min; weighing the materials again; making up the lost weight with the methanol; shaking up; filtering; standing;
c. providing content determination under chromatographic condition 1:
wherein mobile phase A is acetonitrile, mobile phase B is water;
wherein detection wavelength is 270 nm; column temperature is 30° C.; flow rate is 1 ml/min; sample injection volume is 10 μl; and sample injection is performed twice;
wherein isocratic elution conditions are:

| time, min | mobile phase A %, acetonitrile | mobile phase B %, water |
|---|---|---|
| 0-15 | 30 | 70; | d. making a standard curve by diluting the standard solution by ½ gradient to obtain 5 concentration gradients, analyzing according to the chromatographic conditions, and drawing the standard curve; taking the extract sample solution, analyzing according to the chromatographic condition 1 and calculating the content of the icariin through the standard curve;
e) providing fingerprint conditions of the epimedium brevicornu extract:
(1) accurately weighing 0.1 g of epimedium brevicornu extract into 50 ml volumetric flask; dissolving in methanol; conducting ultrasonic treatment for 30 min; placing at room temperature; making constant volume; filtering; concentrating; and passing through a membrane;
(2) utilizing the following chromatographic conditions: octadecylsilane chemically bonded silica is used as a filler; the flow rate is 1 ml/min; the wavelength is 269 nm; the column temperature is 30° C.; the sample injection volume is 10 μl; and the sample injection is performed once;

| | time, min | | | | |
|---|---|---|---|---|---|
| | 0-17 | 17-35 | 35-65 | 65-70 | 70-85 |
| acetonitrile, % | 15-23 | 23 | 23-50 | 50-15 | 15; | a. further preparation of the standard solution: taking 6 mg of tanshinone IIA standard into 10 ml volumetric flask, dissolving in methanol, and making constant volume;
b. preparation of the extract sample solution: taking 0.1 g of salviae miltiorrhizae extract; putting the extract into a conical flask with a stopper; adding 50 ml of methanol; weighing the materials; conducting ultrasonic treatment for 30 min; weighing the materials again; making up the lost weight with the methanol; shaking up; filtering; standing;
c. providing content determination under chromatographic condition 2:
wherein mobile phase A is acetonitrile, mobile phase B is water;
detection wavelength is 270 nm; column temperature is 20° C.; flow rate is 1 ml/min; sample injection is 10 μl; and sample injection is performed twice;
wherein the gradient elution conditions are:

| time, min | mobile phase A %, acetonitrile | mobile phase B %, water |
|---|---|---|
| 0-6 | 61 | 39 |
| 6-20 | 61-90 | 39-10 |
| 20-20.5 | 90-61 | 10-39 |
| 20.5-30 | 61 | 39; | d. making a standard curve: diluting the standard solution by ½ gradient to obtain 5 concentration gradients, analyzing according to the chromatographic conditions, and drawing the standard curve; taking the extract sample solution, analyzing according to the chromatographic conditions, and calculating the content of the tanshinone IIA through the standard curve;

providing fingerprint conditions of the salviae miltiorrhizae extract:

(1) accurately weighing 0.1 g of salviae miltiorrhizae extract into 50 ml volumetric flask; dissolving in methanol; conducting ultrasonic treatment for 30 min; placing at room temperature; making constant volume; filtering; concentrating; and passing through a membrane;

(2) chromatographic conditions: octadecylsilane chemically bonded silica is used as a filler; the flow rate is 1 ml/min; the wavelength is 270 nm; the column temperature is room temperature; the sample injection volume is 10 µl; and the sample injection is performed once;

|  | time, min | | | |
| --- | --- | --- | --- | --- |
|  | 0-20 | 20-50 | 50-52 | 52-62 |
| acetonitrile, % | 20-60 | 60-80 | 80-20 | 20; |

Step 3:

a. preparation of the standard solution by taking 8 mg of a protodioscin standard into 10 ml volumetric flask, dissolving in methanol, and making constant volume;

b. preparation of the extract sample solution: taking 0.1 g of *dioscorea nipponica* makino extract; putting the extract into a conical flask with a stopper; adding 50 ml of methanol; weighing the materials; conducting ultrasonic treatment for 30 min; weighing the materials again; making up the lost weight with the methanol; shaking up; filtering; standing; and taking the supernatant;

c. providing content determination under chromatographic condition 3:

wherein octadecylsilane chemically bonded silica is used as a filler;

wherein mobile phase A is acetonitrile, mobile phase B is water; and isocratic elution is performed;

wherein detection wavelength is 203 nm; column temperature is 30° C.; flow rate is 1 ml/min; sample injection volume is 10 µl; and sample injection is performed twice;

isocratic elution conditions used under chromatographic condition 3:

| time, min | mobile phase A<br>%, acetonitrile | mobile phase B<br>%, water |
| --- | --- | --- |
| 0-10 | 37 | 63 | taking the standard solution and the extract sample solution, analyzing according to the chromatographic conditions, and calculating the content of the protodioscin through a single-point method;

further providing fingerprint conditions of *dioscorea nipponica* makino extract:

(1) accurately weight 0.1 g of *dioscorea nipponica* makino extract into 50 ml volumetric flask; dissolving in methanol; conducting ultrasonic treatment for 30 min; placing at room temperature; making constant volume; filtering; concentrating; and passing through a membrane;

(2) chromatographic conditions: octadecylsilane chemically bonded silica is used as a filler; flow rate is 1 ml/min; wavelength is 210 nm; column temperature is 30° C.;

sample injection volume is 10 µl; and sample injection is performed once;

|  | time, min | | | | | | |
| --- | --- | --- | --- | --- | --- | --- | --- |
|  | 0-10 | 10-20 | 20-40 | 40-55 | 55-65 | 65-70 | 70-80 |
| acetonitrile, % | 20-25 | 25-35 | 35-80 | 80-100 | 100 | 100-20 | 20. |

2. The method for product quality control and fingerprint detection of the epimedium brevicornu complex according to claim 1, wherein the epimedium brevicornu complex is composed of the following raw materials in parts by weight: 1.2 parts of glucosamine, 0.4 part of collagen, 0.2 part of chondroitin sulfate and 0.35 part of traditional Chinese medicine extract;

the traditional Chinese medicine extract comprises the following components in parts by weight: 7-12 parts of epimedium brevicornu, 0.5-3 parts of salviae miltiorrhizae, 6.5-9 parts of *Dioscorea nipponica* makino, 1-5 parts of rhizoma drynariae and 1-5 parts of dodder.

3. A method for product quality control and fingerprint detection of an epimedium brevicornu complex, the method for product quality control and fingerprint detection of the epimedium brevicornu complex comprising:

Step 1: providing fingerprint detection under chromatographic conditions 1:

a chromatographic column adopts octadecylsilane chemically bonded silica as a filler; mobile phase A is acetonitrile, mobile phase B is water; detection wavelength is 210-270 nm; column temperature is 30° C.; flow rate is 1 ml/min; sample injection volume is 10 µl; and gradient elution conditions:

| time, min | mobile phase A<br>%, acetonitrile | mobile phase B<br>%, water |
| --- | --- | --- |
| 0-5 | 5-20 | 95-80 |
| 5-15 | 20-30 | 80-70 |
| 15-35 | 30-50 | 70-50 |
| 35-40 | 50-60 | 50-40 |
| 40-50 | 60-80 | 40-20 |
| 50-60 | 80-100 | 20-0 | providing product content detection under chromatographic condition 2:

mobile phase A is acetonitrile, mobile phase B is water, acetonitrile: water=30:70, and gradient elution; detection wavelength is 270 nm; column temperature is 30° C.; flow rate is 1 ml/min; sample injection is performed twice;

Step 2: preparation of a test article:

accurately weighing 1 g of epimedium brevicornu complex of claim 2; putting the composition into a conical flask with a stopper; adding 500 ml of methanol; weighing the materials; conducting ultrasonic treatment for 30 min; weighing the materials again; making up the lost weight with the methanol; shaking up; filtering; concentrating the filtrate to 50 ml; standing;

Step 3: preparation of the standard solution:

taking 10 mg of icariin standard into 10 ml volumetric flask, dissolving in methanol, and making constant volume;

making a standard curve: diluting the standard solution by ½ gradient to obtain 5 concentration gradients: 0.0625 mg/ml, 0.125 mg/ml, 0.25 mg/ml, 0.5 mg/ml and 1.0 mg/ml; analyzing according to the chromatographic condition 2; and drawing the standard curve;

taking the supernatant obtained in step 2, analyzing according to the chromatographic condition 2, and calculating the content through the standard curve;

taking the supernatant obtained in step 2, and analyzing according to the chromatographic condition 1 to obtain a fingerprint.

4. The method for product quality control and fingerprint detection of the epimedium brevicornu complex according to claim 3, wherein the fingerprint of the epimedium brevicornu complex is:

the fingerprint comprises 15 common peaks, and the relative retention times of the peaks are:

(1) 3.263, (2) 16.857, (3) 17.785, (4) 20.299, (5) 23.178, (6) 23.747, (7) 24.167, (8S) 25.357, (9) 27.064, (10) 28.092, (11) 37.908, (12) 41.202, (13) 53.441, (14) 54.928 and (15) 58.238.

5. The method for product quality control and fingerprint detection of the epimedium brevicornu complex according to claim 1, wherein the methanol is a 100% methanol solution.

\* \* \* \* \*